United States Patent [19]
Bartlett

[11] Patent Number: 6,106,228
[45] Date of Patent: Aug. 22, 2000

[54] FAN SHROUD AIR DOOR ASSEMBLY

[75] Inventor: Eric R. Bartlett, London, Canada

[73] Assignee: Siemens Electric Limited, London, Canada

[21] Appl. No.: 08/711,703

[22] Filed: Sep. 6, 1996

[51] Int. Cl.$^7$ ............................................. F01P 5/10
[52] U.S. Cl. .................. 415/146; 416/169 A; 123/41.11; 123/41.49
[58] Field of Search ..................................... 415/146, 147, 415/220, 223, 183, 185, 186, 189, 208.1, 211.1; 123/41.11, 41.12, 41.49; 416/169 A; 165/98, DIG. 93, DIG. 96, DIG. 97, DIG. 98, DIG. 99; 16/257, 267

[56] References Cited

U.S. PATENT DOCUMENTS

| | | | |
|---|---|---|---|
| 1,458,593 | 6/1923 | Raleigh | 165/98 |
| 1,996,499 | 4/1935 | Young | 165/DIG. 98 |
| 2,153,604 | 4/1939 | Wheller | 415/146 |
| 2,732,581 | 1/1956 | Heck | 16/267 |
| 5,660,149 | 8/1997 | Lakerdas et al. | 123/41.49 |

FOREIGN PATENT DOCUMENTS

| | | | |
|---|---|---|---|
| 1292109 | 10/1972 | United Kingdom | 16/257 |

*Primary Examiner*—Christopher Verdier

[57] ABSTRACT

An air door assembly for a fan shroud assembly includes a door having an upper portion, a lower portion and a hinge portion located between the upper portion and the lower portion, a frame defining an opening in the fan shroud assembly, and a hinge defining a pivotal axis pivotally coupling the hinge portion of the door to the frame. The door is adapted to pivot relative to the frame about the pivotal axis between a fully closed position and a fully open position. The upper portion of the door and the lower portion of the door may be in a substantially horizontal orientation when the door is in a fully open position. The hinge may include a pair of pivot pins extending along the pivotal axis at least partially into the opening from opposite lateral sides of the frame and a corresponding pair of at least partial sleeves at opposite lateral sides of the hinge portion of the door, the pair of pivot pins being received within the pair of at least partial sleeves to couple the door to the frame. The pair of pivot pins may be adapted to snap-fit into the pair of at least partial sleeves. The air door may transition between the closed position and the open position at a first air velocity and between the open position and the closed position at a second air velocity, the first air velocity being greater than the second air velocity. In another preferred embodiment a fan shroud assembly includes a housing having a plurality of openings and at least one air door assembly located within the housing.

30 Claims, 4 Drawing Sheets

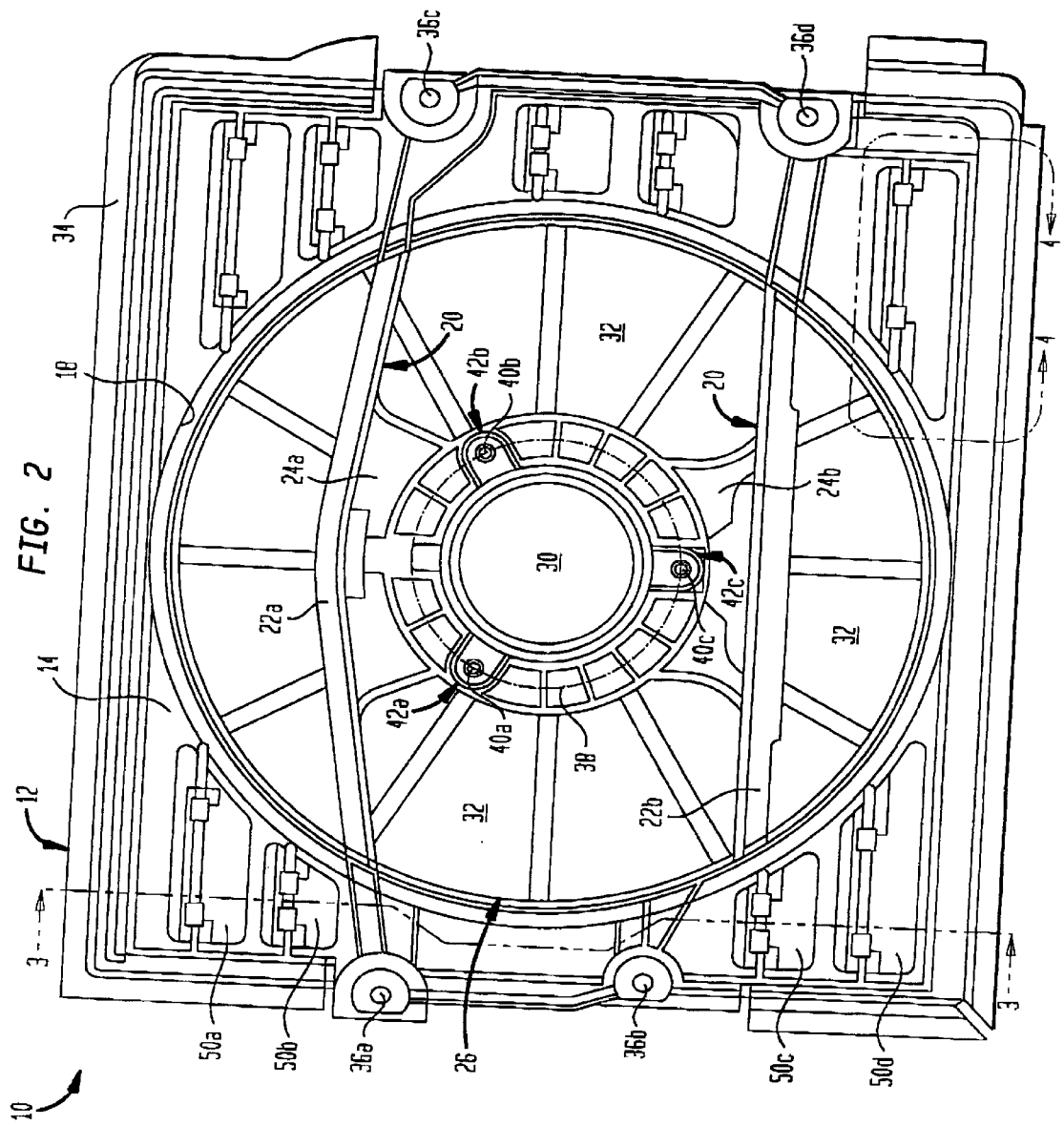

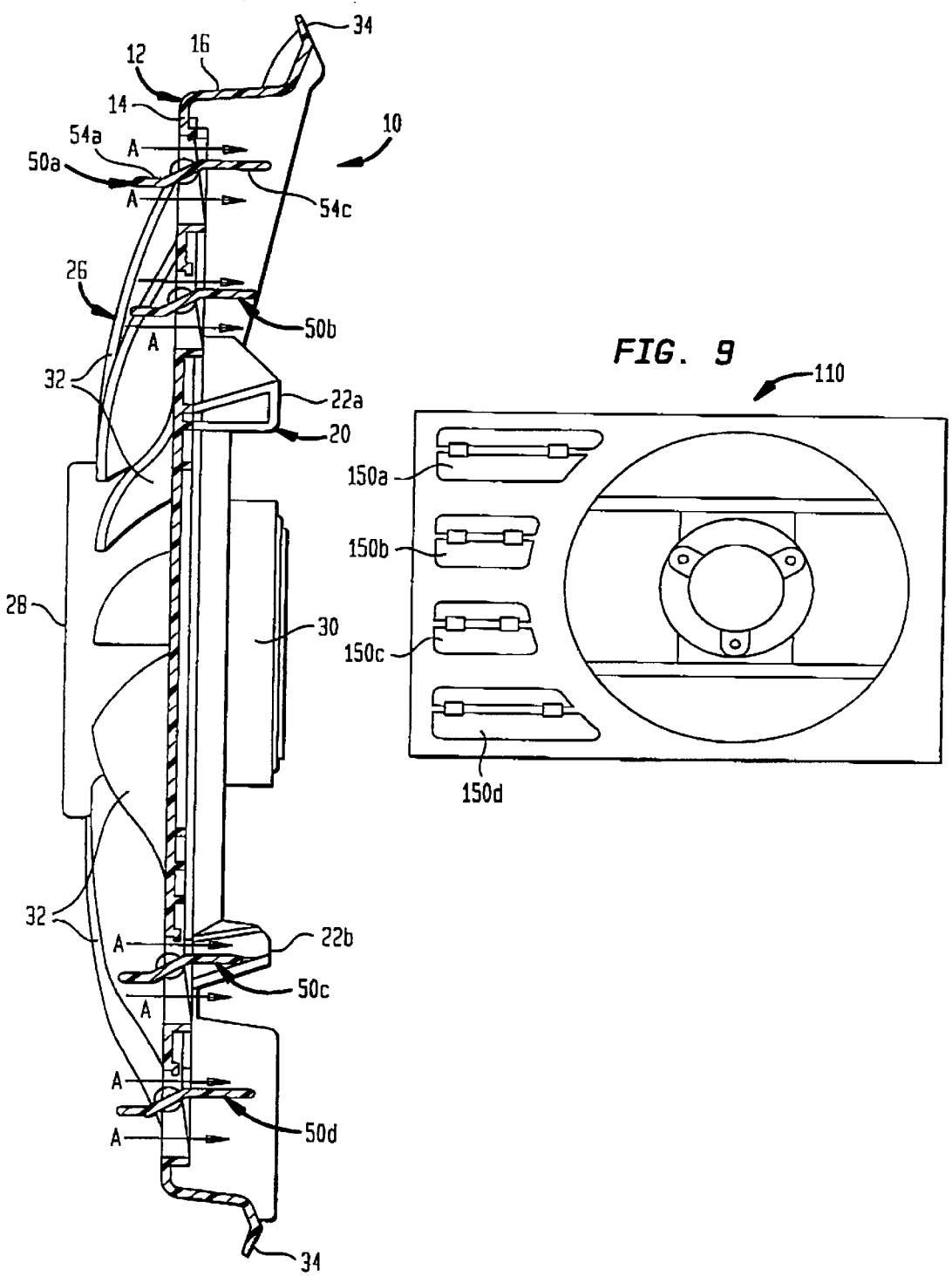

FAN SHROUD AIR DOOR ASSEMBLY

FIELD OF THE INVENTION

The present invention relates to an air door assembly for a fan shroud assembly providing a flow of cooling air in an automotive (or like) application. In particular, the present invention relates to a compact mounting arrangement wherein each air door is mounted in a manner as to provide for a substantially discrete transition between a closed state and an open state and to facilitate a supplemental flow of cooling air.

BACKGROUND OF THE INVENTION

Systems for providing a flow of air for engine cooling in automotive vehicle or like applications are generally known. The design of these engine cooling systems is constrained by flow and thermal requirements, design of related systems and equipment, and size and space constraints within the engine compartment. For example, in an automotive (or like) application having an air conditioning module, a condenser for the air conditioning module is likely to be positioned in relatively close proximity to a heat exchanger (e.g. radiator or the like) provided for engine cooling, both being located at or near the front of the engine compartment (and a potential supply of cooling air). In a typical arrangement of this type, the condenser and heat exchanger may be provided with a flow of cooling air supplied by a fan which is mounted in a fan shroud assembly in front of the condenser and heat exchanger. The fan (typically powered by an electric motor) is configured to force cooling air onto and through the condenser and heat exchanger from the front of the engine compartment. One type of exemplary arrangement of a fan shroud assembly is shown in U.S. Pat. No. 5,244,347 issued to Gallivan et al. (and commonly assigned to the owner of the present application), which is incorporated by reference herein.

It is known to include one or more air doors in order to facilitate a flow of supplemental cooling air to the engine in addition to that ordinarily provided by the fan itself. The air door assembly is typically designed to allow supplemental cooling air to flow through the engine compartment as the vehicle increases in velocity. In a common arrangement each air door fits within a corresponding opening, the door being pivotally mounted across the top of the opening by a hinge and hanging vertically from the top of an opening. According to this known mounting arrangement, the door will open with respect to the opening when the air flow on the door (which is a function of the air velocity which in turn relates to the velocity at which the automobile is traveling) develops sufficient force (i.e. pressure action over a surface area) to overcome the forces acting to maintain the vertically-hanging door in a closed state.

According to this known arrangement, the velocity at which the door will tend to open (and thereby allow the flow of supplemental cooling air into the engine cooling system) is dependent upon such factors as the weight of the door, the effective frontal surface area and shape of the door, inertia and friction effects, and the like. Nevertheless, due to the effects present in this known arrangement, it is unlikely that the door can be maintained consistently in a fully opened state (e.g. horizontal orientation) as to maximize the flow area for supplemental cooling air. Moreover, the fan shroud assembly, condenser, heat exchanger and other equipment must be positioned to allow clearance and avoidance of interferences or obstructions with the fully-opened air door. In order to maintain a compact profile, it may be necessary to make a trade-off between a desired size of the door (and its corresponding opening) and placement and overall design of a compact engine cooling system. Furthermore, this known arrangement is not well-suited to provide for a discrete transition of the door between a fully closed state and fully open state, as the door tends to open gradually as the velocity of the air flow increases.

Accordingly, it would be advantageous to have an air door arrangement that is of a compact and yet sufficiently large open area, that does not give rise to interferences with other equipment or systems, and that can be accommodated with air doors of a variety of materials and shapes. It would also be advantageous to have a ram air door arrangement that can be adapted to provide for a discrete transition of the door between a fully closed state and a fully open state at a particular threshold air velocity (and also provides for a hysteresis effect). It would further be advantageous to have an air door mounting arrangement wherein the hinge point is moved from the top of the opening (as in the known mounting arrangement) to a lower position within the opening to achieve certain design advantages. It would further be advantageous to have an air door that is designed for relatively simple assembly and low cost manufacture.

SUMMARY OF THE INVENTION

The present invention relates to an air door assembly for a fan shroud assembly with a door having an upper portion, a lower portion and a hinge portion located between the upper portion and the lower portion, a frame defining an opening in the fan shroud assembly, and a hinge defining a pivotal axis pivotally coupling the hinge portion of the door to the frame. The door is adapted to pivot relative to the frame about the pivotal axis between a fully closed position and a fully open position.

The present invention also relates to an air door assembly to facilitate an air flow through a housing of a fan shroud assembly with a door having a first portion, a second portion having a first pivot mechanism and a third portion (the second portion being located between the first portion and the third portion), and a frame defining an opening in the housing, the frame having a second pivot mechanism. The first pivot mechanism is coupled to the second pivot mechanism to pivotally couple the door to the frame, the door being adapted to pivot relative to the frame between a substantially closed position and a substantially open position.

The present invention further relates to a fan shroud assembly with a housing having a plurality of openings and at least one air door assembly located within the housing. At least one air door assembly includes a door having a first portion, a second portion and a third portion, the second portion having a first pivot mechanism and being located between the first portion and the third portion and a frame defining an opening in the housing. The frame has a second pivot mechanism, the first pivot mechanism is pivotally coupled to the second pivot mechanism whereby the door is coupled to the frame and is adapted to pivot relative to the frame about a pivotal axis between a substantially closed position and a substantially open position.

BRIEF DESCRIPTION OF THE DRAWINGS

FIG. 2 is a rear view of the fan shroud assembly;

FIG. 3 is a cross-section (cut-away) side view of the fan shroud assembly (showing air flow through the ram air door assemblies) along line 3—3 of FIG. 2;

FIG. 9 is a rear view of a fan shroud assembly with a plurality of air doors assemblies according to an alternative embodiment of the present invention.

DETAILED DESCRIPTION OF THE PREFERRED EMBODIMENTS

Figure 1:
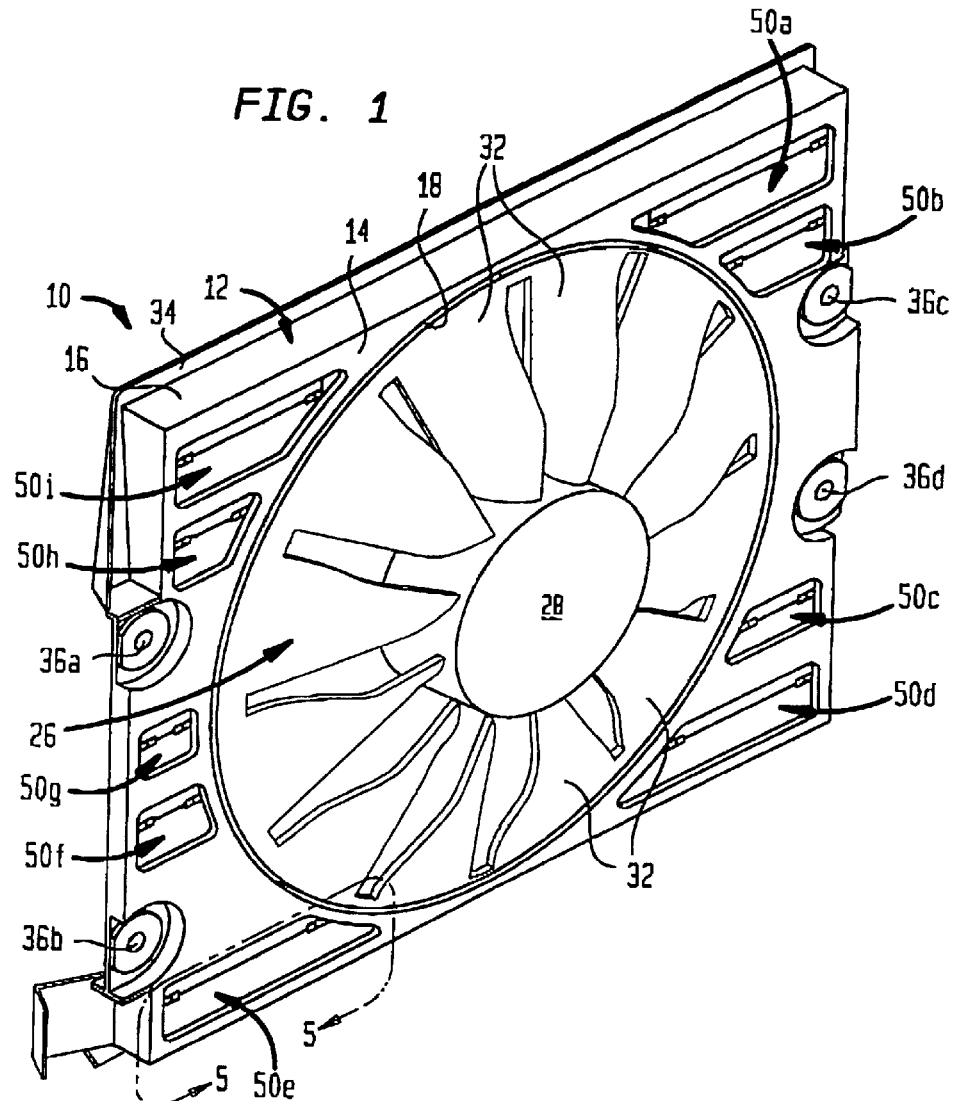
FIG. 1 is a front perspective view of a fan shroud assembly with a plurality of air door assemblies according to a preferred embodiment of the present invention.

Referring to FIGS. 1 through 3, a fan shroud assembly 10 is shown according to a preferred embodiment of the present invention. Fan shroud assembly 10 as shown is designed for use in an automotive (or like) application, as part of the engine cooling system and air conditioning module, as discussed for example in U.S. Pat. No. 5,244,347, incorporated by reference herein. (In this exemplary application the fan shroud assembly is installed directly in front of a condenser within the air conditioning module, which is installed directly in front of the heat exchanger for the engine cooling system).

Fan shroud assembly 10 includes a one-piece (e.g. integrally-formed) housing 12, made of a suitably durable and heat-resistant material of sufficient structural strength, such as moldable plastic or nylon or the like (e.g. "NYLON 6,6"). Housing 12 includes a substantially flat inner portion 14 (e.g. a fan-surrounding portion) and a substantially continuous outer portion 16 (forming an outer ledge) generally perpendicular to inner portion 14. As is evident in FIG. 2, fan shroud assembly 10 has a variable depth (based on the varying width of outer portion 16) at any point around the perimeter of housing 12. Inner portion 14 has a large central and substantially circular opening 18 (adapted for housing a fan) with a central motor mounting structure 20 (integral mount). Motor mounting structure 20 has two substantially horizontal support arms 22a and 22b (shown with substantially vertical support members 24a and 24b connected thereto). A fan 26 is mounted at its hub 28 within housing 12 through mounting structure 20 at support members 24a and 24b to a motor 30. The support arms 22a and 22b and support members 24a and 24b provide rigidification and fixed positioning of fan 26 and motor 30 within housing 12. Fan 26 has a plurality of fan blades 32 which are free to rotate within circular opening 18.

Referring now to FIG. 2, a front view of shroud assembly 10, support arms 22a and 22b as well as support members 24a and 24b are visible along with motor 30 and blades 32 of fan 26 (within circular opening 18 of housing 12 of fan shroud assembly 10). According to the preferred embodiment, central motor mounting structure 20 of housing 12 includes three mounting locations (e.g. at a bolt circle 38) to facilitate the mounting of motor 30 to fan shroud assembly 10 at three mounting points 42a, 42b and 42c. Motor 30 is securely bolted to mounting structure 20 by three bolts 40a through 40c corresponding in position to three mounting points 42a through 42c in mounting structure 20. (According to alternative embodiments, the motor can be suitably fastened to the fan shroud assembly in any manner capable of providing secure mounting (e.g. by any fastener arrangement).) Fan 26 is securely coupled to an axial shaft (not shown) of motor 30 at hub 28; the coupling allows free rotation (e.g. free of interference) of hub 28 and fan blades 32 (along with the motor shaft) when motor 30 is operating. Rotation of the fan blades draws a supply of primary cooling air through fan shroud assembly 10. In any preferred embodiment, fan blades 32 (12 are shown) are configured to provide a suitable volume of air through fan shroud assembly 10 for the intended application.

Extending from outer portion 16 of housing 12 is a seal 34 (which may comprise one piece or several pieces of a rubber-like material such as "SANTOPRENE" or the like). In the preferred embodiment, outer portion 16 is adapted (i.e. shaped and conformed) for suitable mounting to a mounting frame (not shown) of the automobile (not shown) at a series of mounting points (shown as four mounting holes 36a through 36d with rubber grommets). According to the preferred embodiment, housing 12 is mounted to a mounting frame (not shown) in the vehicle engine compartment in a secure and essentially air-tight manner, which is facilitated by seal 34.

As shown in FIGS. 1 through 3, housing 12 also includes a series of nine air door assemblies 50a through 50i positioned within inner portion 14 about and adjacent to both the periphery of circular opening 18 and the lateral sides of outer portion 16. In FIG. 3, fan shroud assembly 10 is shown in cross-section with fan 26 and motor 30. Four air door assemblies 50a through 50d are also visible and are shown in an open orientation allowing a flow of supplemental cooling air (designated with reference letter A) to flow through fan shroud assembly 10 supplementing the flow of primary cooling air through fan 26 (not designated) through central opening 18, as provided by fan 26.

Figure 4:
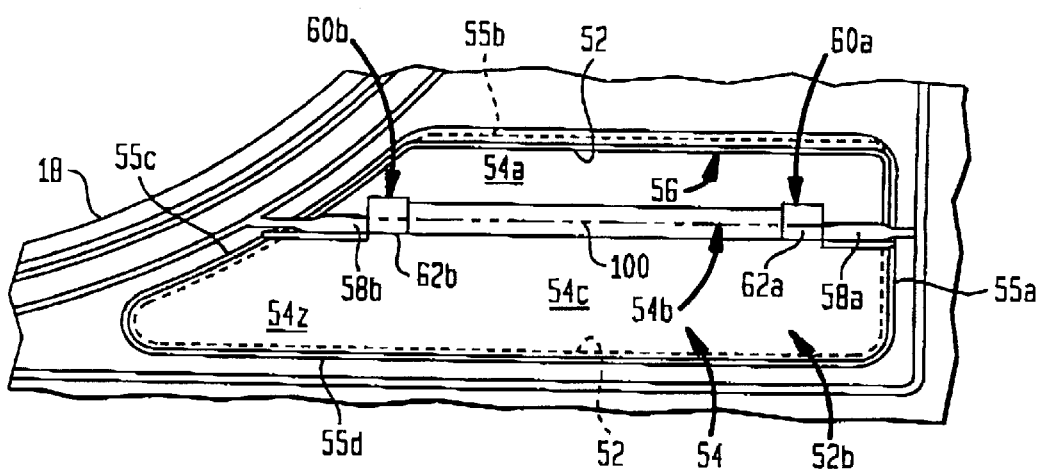
FIG. 4 is a cut-away rear view of the fan shroud assembly showing detail of an air door assembly along line 4—4 of FIG. 2.
Figure 5:
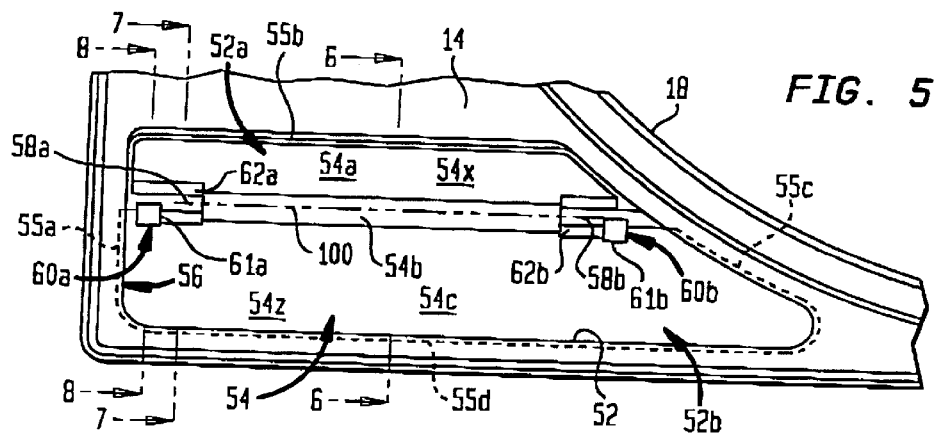
FIG. 5 is a cut-away and front view of the fan shroud assembly showing detail of the air door assembly along line 5—5 of FIG. 1.

Referring now to FIGS. 4 and 5, an air door assembly 50e is shown in detail. Air door assembly 50e is formed in a door opening 52 defined by a frame 56 formed (recessed) within inner portion 14 of housing 12 of fan shroud assembly 10. Door opening 52 is formed in a shape substantially identical to the shape of a corresponding air door 54. According to any preferred embodiment, both door opening 52 and air door 54 are formed of a shape that reflects the location of the air door assembly and the "fit" within inner portion 14 of housing 12 relative to circular opening 18. For example, door opening 52 and air door 54 as shown in FIGS. 4 and 5 are shaped with three substantially straight sides 55a through 55d (e.g. vertical side 55a and horizontal sides 55b and 55d) and one curved side 55c; curved side 55c follows a curve that substantially corresponds to the curved perimeter of circular opening 18 of housing 12 (i.e. within which fan 26 rotates). As is evident in FIGS. 1 and 2, the door openings and corresponding air doors of the nine air door assemblies while of various sizes, are of this basic shape. In alternative embodiments, other shapes can be employed for the air doors and corresponding door openings.

According to the preferred embodiment, air door assemblies 50a through 50i are configured to remain closed (i.e. to prevent a flow of air through the fan shroud assembly) until there is a pre-determined threshold air velocity (an air velocity typically corresponding to a designated velocity of the vehicle); at the threshold velocity, door 54 will open and allow air flow A through door opening 52 and thus through fan shroud assembly 10 (e.g. into the heat exchanger for the engine cooling system). This threshold velocity may be, but need not be, the same or coordinated between particular ram air doors.

As shown in FIGS. 4 and 5, substantially rigid door 54 has an upper portion 54a, a central hinge portion 54b and a lower portion 54c. The hinge portion 54b of door 54 has a pivot mechanism shown as a pair of sleeve-tab assemblies 60a and 60b (each formed from a complementing set of curved tabs 61a and 61b and partial sleeve passages 62a and 62b in a sleeve-tab arrangement shown more clearly in FIGS. 7 and 8). Also shown in FIGS. 4 and 5 is a pivot mechanism shown as a pair of pivot pins 58a and 58b which extend inwardly into opening 52 from opposite sides of an inner frame 56 of housing 12. (The coacting pivot mechanisms of the door and the frame form a hinge.) Pivot pins 58a and 58b define (i.e. are aligned along) a pivotal axis 100 about which door 54 will pivot relative to frame 56 of housing 12. As shown in FIG. 3, pivotal axis 100 is displaced slightly inwardly with respect to the front (e.g. face) of housing 12.

Figure 6:
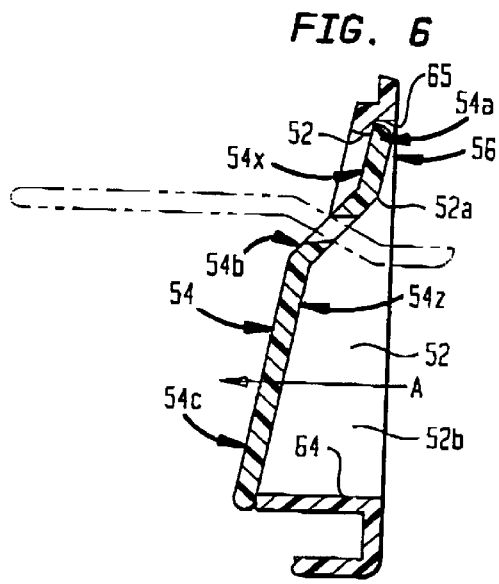
FIGS. 6 through 8 are cut-away and side views of various sections of the air door assembly taken along lines 6—6, 7—7, and 8—8, respectively, of FIG. 5.
Figure 7:
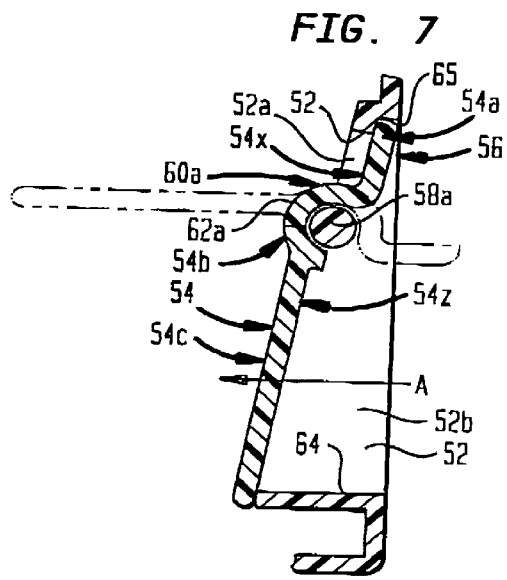
Figure 8:
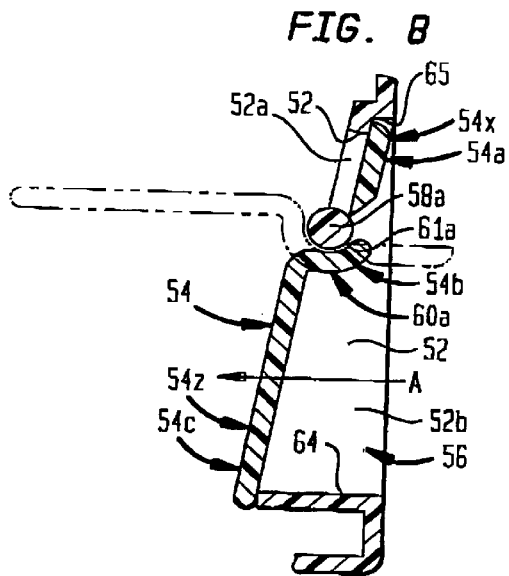

Pivot pins 58a and 58b are coupled with (i.e. snapped into resilient tabs 61a and 61b and passages 62a and 62b) corresponding sleeve-tab assemblies 60a and 60b, coupling door 54 to frame 56 and thereby to housing 12 of fan shroud assembly 10 in a secure connection that permits pivotal movement of door 54 with respect to frame 56 about pivotal axis 100 from a closed position (shown in FIGS. 6 through 8) to a substantially fully open position (shown in phantom lines in FIGS. 6 through 8). According to a preferred embodiment (shown in FIGS. 6 through 8), door 54 is oriented in a position about 12 degrees from vertical in the closed position. The top edge of upper portion 54a of door 54 rests within a recess 65 at the front upper edge of frame 56. The bottom edge of lower portion 54 rests on the inner edge of a substantially horizontal ledge 64 extending from the lower edge of frame 56. Door 54 is in a substantially horizontal orientation in the substantially fully open position, thereby forming in opening 52 an upper subopening 52a and a lower subopening 52b, with a maximum total open area for air flow therethrough. (The 12 degree orientation of the door from vertical in the closed state has been found in one preferred embodiment to prevent rattling of the relatively free pivoting door within the opening in the frame; other angular orientations may serve this function for other door shapes and sizes.)

The shape of door 54 according to a preferred embodiment is shown in FIGS. 4 through 8. There are evident in door 54 each of the three portions (upper portion 54a, hinge portion 54b and lower portion 54c). Upper portion 54a and lower portion 54c are essentially flat in profile and are oriented in parallel planes; partially flat hinge portion 54b is oriented at an angle between upper portion 54a and lower portion 54c (as is shown clearly in FIG. 6). As shown, in the preferred embodiment, upper portion 54a is of smaller dimension than lower portion 54c and the angle of hinge portion 54b is approximately 24 degrees. (According to alternative embodiments, the door and its portions can have any of a variety of shapes conformed to suit particular functional needs or space constraints, including shapes where the distinction or transition between the portions of the door are less pronounced or perceptible for example, in a flat or fully or partially curved profile.)

In FIG. 5, in an exemplary embodiment, it is shown that lower portion 54c of door 54 is of a substantially identical, yet slightly larger effective frontal (surface) area 54z than the corresponding effective frontal area of the corresponding lower subopening 52b of opening 52 within frame 56 of housing 12; the lower edge of lower portion 54c of door 54 rests upon the lower inner edge of ledge 64 of frame 56 of opening 52 within housing 12. Similarly, upper portion 54a of door 54 is of a substantially identical yet slightly larger effective frontal (surface) area 54x than the corresponding effective frontal area of corresponding upper subopening 52a of opening 52 within frame 56 of housing 12; the upper edge of upper portion 54a of door rests upon the upper outer edge of frame 56 of housing (as is shown clearly in FIG. 4). Pivotal rotation of the door is thereby restricted to one direction from the closed state. In any preferred embodiment, the door and its opening (or open space within the recess of the frame) will be configured in a relatively tight and leak-free manner to reduce or prevent undesired air flow in the closed position.

Comparing the views of FIGS. 4 and 5, the coacting snap-fit mounting arrangement of sleeve-tab assemblies 60a and 60b of hinge portion 54b of door 54 and of pivot pins 58a and 58b of frame 56 of housing is evident. FIGS. 7 and 8 demonstrate the positioning of pivot pins 58a and 58b (one is shown) along and within corresponding sleeve-tab assemblies 60a and 60b (one is shown) and the holding pattern of tabs 61 and passages 62. The combination of pivot pins 58a and 58b and sleeve-tab assemblies 60a and 60b provide a relatively free-moving hinge having a particularly preferred combination of pivot mechanisms. In alternative embodiments, other types of pivot mechanisms may be used or combined to provide a suitable pivotal coupling of the door to the frame about the desired pivotal axis.

In the preferred embodiments, it is desired to have the door remain fully closed until the threshold air velocity is reached (in order to prevent rattling and noise). In alternative embodiments, the door can be fitted with a weight or set of counterweights (not shown) that facilitate the opening of the door at a particular threshold air velocity (and the maintenance of the door in a substantially closed position until the threshold velocity is reached). In other alternative embodiments, the shape, orientation or materials of construction of the door can be modified to provide a similar effect. Supplemental weights (not shown) or an equivalent can be added to or formed within the doors to provide a desired weight distribution. In any preferred embodiment, a resilient and compliant material (such as polypropylene) is used for the door to provide a proper combination of stiffness, wear, resistance, weight, strength and thermal properties, along with cost and manufacturing considerations.

Door 54 is free to pivot about pivotal axis 100, and will tend to do so when a flow of air (shown by reference letter A) is provided on the lower and upper frontal areas 54z and 54x of door (as facilitated generally by the air flow into the engine compartment of the vehicle). An air flow acting on lower frontal area 54z of lower portion 54c of door 54 will develop a pressure force corresponding to the velocity of the air flow. This pressure force will eventually be sufficient (at a given threshold velocity) to overcome the gravitation force that acts (given the shape and weight distribution) to retain door 54 in a closed position, as well as the counteracting pressure force developed on the smaller effective frontal area 54x of upper portion 54a of door, and any internal frictional forces developed in the hinge formed at the coupling of pivot pins 58a and 58b and sleeve-tab assemblies 60a and 60b. Air pressure within the engine cooling system or module may also provide a force acting on the doors (typically tending to hold the doors closed). (All of the forces act as moment forces tending to rotate door relative to frame about pivotal axis 100.) At the threshold air velocity (which would generally correspond to the forward velocity of the vehicle), according to a particularly preferred embodiment, door 54 makes a substantially discrete transition (snap-action) from the closed position to the substantially horizontal open position. This transition is aided by the over-center (i.e. with respect to pivotal axis 100) positioning of the center of gravity of upper portion 54a of door 54, which tends to rotate door 54 into the substantially horizontal position shown in FIG. 3. While this effect can be manipulated by various arrangements, door shapes and positioning of the hinge, it has been found in a preferred embodiment that a placement of the hinge approximately one-third of the way down from the top of the door and the corresponding opening provides suitable performance in one application. Depending upon the desired threshold velocity (e.g. 40 miles per hour in one embodiment) and other factors noted previously, the desired hinge placement may vary. Air flow across the fully open door will tend to retain the door in the fully open state.

It has been found that the shape of the door can be provided to develop a hysteresis effect wherein after the door has been substantially fully opened at the threshold air flow velocity, it will remain substantially fully open for a period even after the speed of vehicle is reduced (and thereby the air flow velocity is reduced). This creates a hysteresis region between the first threshold air velocity at which the air door transitions from the closed state to the open state and a second threshold at which the air door transitions from the open state to the closed state, the first threshold velocity being greater than the second threshold velocity. The size of the hysteresis region (if any) can be varied by varying such factors as the shape and size of the door.

In the preferred embodiment, as shown clearly in FIG. 3, door 54 does not substantially increase the width of housing 12 and fan shroud assembly 10 even when in the fully open position because of the placement of pivotal axis 100 with respect to the profile of housing 12 and the profile of door 54. (None of lower portion 54c and only part of upper portion 54a extends beyond the profile of fan shroud assembly 10.) As is evident, upper portion 54a and lower portion 54c of open door 54 pivot in a complementary (low profile) manner (extending forward and rearward, respectively) with respect to pivotal axis 100 and frame 56 of housing 12. In the conventional vertically hanging ram air door arrangement, the entire open door would extend in the rearward direction (which means that to reduce the overall profile, the door must be of a smaller height). According to any preferred embodiment, the overall profile of the fan shroud assembly when the door is open is narrower than it would be if a door of identical size was mounted at the top of its respective frame.

According to the preferred embodiment, the total flow of air through the system of ram air door assemblies can be controlled by varying the size and shape of the doors to gain a "staging" effect wherein separate air doors to open at a similar threshold air flow velocity. Alternatively, the doors may be configured to open at different threshold air velocities. By coordinating this effect the total air flow can be controlled to some extent as a matter of the velocity of the vehicle (which would ordinarily have a higher demand for cooling air at higher vehicle velocities when the engine is under demand to provide more power). Alternative embodiments may have a variety of numbers and arrangements of air doors within the fan shroud assembly. FIG. 9 shows a fan shroud assembly 110 having an off-center arrangement of four ram air doors 150a through 150d according to an alternative embodiment.

Specific dimensions are not critical to the air door although the air door is intended to have a centrally located hinge portion (or pivot mechanism) and a size, shape and weight distribution that provides for suitable opening of the door at a desired air flow velocity. For an exemplary door according to an exemplary preferred embodiment, upper portion 54a has a height of approximately 0.3125 inches and a length of approximately 4.25 inches, angled hinge portion 54b (with centrally located sleeve-tab assembly) has a height of approximately 0.3125 inches and a length of approximately 3.25 inches (including the sleeves but excluding the tabs), and lower portion 54c has a height of approximately 1.0 inch and a length of varying from approximately 4.25 inches (at its top edge) to approximately 3.25 inches (at its bottom edge). Door 54 has an overall thickness of approximately 0.0625 inches and is formed of a polypropylene material. This exemplary door has been found to provide suitable performance in an exemplary fan shroud assembly for an automotive cooling system application; other doors of varying shapes and dimensions (though substantially similar thickness) are also installed within the fan shroud assembly in this exemplary embodiment.

Although only a few exemplary embodiments of this invention have been described in detail above, those skilled in the art will readily appreciate that many modifications are possible in the exemplary embodiments without materially departing from the novel teachings and advantages of this invention. For example, the hinge can employ any arrangement known for providing suitable movement of a door relative to a frame, including a cam arrangement, a through-going axial shaft, an elliptical pintle; a spring or like dynamic system or device can assist the coaction or assist the discrete transition between open and closed or the hysteresis effect. Likewise, the positions and places of the pivot mechanisms can be reversed with respect to the door and frame of the housing. Accordingly, all such modifications are intended to be included within the scope of the invention as defined in the following claims. In the claims, each means-plus-function clause is intended to cover the structures described herein as performing the recited function and not only structural equivalents but also equivalent structures.

Other substitutions, modifications, changes and omissions may be made in the design, operating conditions and arrangement of the preferred embodiments without departing from the spirit of the invention as expressed in the appended claims.

What is claimed is:

1. A fan shroud assembly, which comprises:
   a housing defining a generally centrally disposed fan opening dimensioned to accommodate an electric fan and a side opening disposed adjacent the periphery of the housing; and
   a door assembly mounted to the housing adjacent the side opening, the door assembly including:
      a door having an upper portion, a lower portion, and a hinge portion located between the upper portion and the lower portion;
      a frame and;
      a hinge defining a pivotal axis pivotally coupling the hinge portion of the door to the frame;
      wherein the door is adapted to pivot relative to the frame about the pivotal axis between a substantially fully closed position and a substantially fully open position, the door dimensioned and configured to remain in the fully closed position until air flow thereagainst increases to a threshold air velocity wherein at the threshold air velocity the door moves to the fully open position.

2. The assembly of claim 1 wherein the upper portion of the door and the lower portion of the door are in a subtantially horizontal orientation when the door is in the fully open position.

3. The assembly of claim 2 wherein the pivotal axis defines across the frame within the side opening an upper flow path above the hinge portion of the door and a lower flow path below the hinge portion of the door.

4. The assembly of claim 1 wherein the hinge comprises a pair of pivot pins extending along the pivotal axis at least partially into the side opening from opposite lateral sides of the frame and a corresponding pair of at least partial sleeves at opposite lateral sides of the hinge portion of the door, the pair of pivot pins being received within the pair of at least partial sleeves to couple the door to the frame.

5. The assembly of claim 4 wherein the pair of pivot pins is formed integral to the frame.

6. The assembly of claim 4 wherein the pair of at least partial sleeves is formed integral to the door.

7. The assembly of claim 4 wherein the pivotal axis is oriented in a substantially horizontal direction.

8. The assembly of claim 4 wherein the pair of pivot pins is adapted to snap-fit into the pair of at least partial sleeves, the pair of pivot pins being retained therein by a pair of corresponding tabs adjacent to the pair of at least partial sleeves.

9. The assembly of claim 1 wherein the door is oriented in a substantially vertical direction when in the fully closed position.

10. The assembly of claim 1 wherein the door is adapted to transition from the fully closed position to the fully open position at a first air velocity corresponding to the threshold air velocity and from the fully open position to the fully closed position at a second air velocity, the first air velocity being greater than the second air velocity.

11. An air door assembly for a fan shroud assembly, which comprises:
    a door having an upper portion, a lower portion and a hinge portion located between the upper portion and the lower portion, the door having a first effective frontal area;
    a frame defining an opening in the fan shroud assembly, the opening having a second effective frontal area substantially identical to the first frontal area of the door; and
    a hinge defining a pivotal axis pivotally coupling the hinge portion of the door to the frame;
    wherein the door is adapted to pivot relative to the frame about the pivotal axis from a substantially fully closed position to a substantially fully open position, the door dimensioned and configured to remain in the fully closed position until air flow thereagainst increases to a threshold air velocity wherein at the threshold air velocity the door moves to the fully open position.

12. A ram air door assembly to facilitate an air flow through a housing of a fan shroud assembly, the housing having an enlarged fan opening dimensioned to accommodate an electric fan, the assembly comprising:
    a door including a first portion, a second portion having a first pivot mechanism and a third portion, the second portion being located between the first portion and the third portion; and
    a frame defining a side opening in the housing adjacent the door, the frame having a second pivot mechanism, the first pivot mechanism being coupled to the second pivot mechanism to pivotally couple the frame to the door, and the door being adapted to pivot relative to the frame between a substantially fully closed position and a substantially fully open position within the side opening, the door dimensioned and configured to move to the substantially fully open position in response to air flow thereagainst at a first threshold velocity and being adapted to remain in the substantially fully open position until the air flow against the door is reduced to a second threshold flow velocity less than the first threshold velocity, wherein at the second threshold velocity the door moves to the substantially fully closed position.

13. The ram air door assembly of claim 12 wherein the third portion of the door is oriented in a substantially vertical position when the door is in the substantially fully position.

14. The ram air door assembly of claim 12 wherein the third portion of the door is oriented in a substantially horizontal position when the door is in the substantially fully open position.

15. The ram air door assembly of claim 12 wherein the third portion of the door is oriented at an angle of about 12 degrees with respect to vertical when the door is in the substantially fully position.

16. The ram air door assembly of claim 12 wherein the side opening is divided into an upper flow path above the second portion of the door and a lower flow path below the second portion of the door when the door is in the substantially fully open position.

17. The ram air door assembly of claim 12 wherein the door is made of polypropylene.

18. The ram air door assembly of claim 12 wherein the first pivot mechanism comprises a first sleeve located at a right edge of the second portion of the door and a second sleeve located at a left edge of the second portion of the door.

19. The ram air door assembly of claim 12 wherein the first pivot mechanism comprises a first hinge pin extending from a right edge of the frame and a second hinge pin extending from a left edge of the frame, the first hinge pin and second hinge pin being axially aligned with respect to a pivotal axis.

20. The ram air door assembly of claim 12 wherein the first pivot mechanism comprises a pair of axially aligned pivot pins and the second pivot mechanism comprises a pair of axially-aligned hubs which receive and retain the pair of pivot pins to allow the door to pivot relative to the frame.

21. A fan shroud assembly, which comprises:
    a housing having a plurality of openings;
    a plurality of door assemblies mounted adjacent respective openings in the housing, each door assembly including:
        a door having a first portion, a second portion and a third portion, the second portion having a first pivot mechanism and being located between the first portion and the third portion; and
        a frame defining an opening in the housing, the frame having a second pivot mechanism, the first pivot mechanism being pivotally coupled to the second pivot mechanism whereby the door is coupled to the frame and is adapted to pivot relative to the frame about a pivotal axis between a substantially fully closed position and a substantially fully open position; and
    wherein the plurality of door assemblies includes a first door assembly adapted to transition from the substantially fully closed position to the substantially fully open position at a first threshold air velocity and a second air door assembly adapted to transition from the substantially fully closed position to the substantially fully open position at a second threshold air velocity different from the first threshold velocity;
    wherein the first and second door assemblies are dimensioned to remain in the substantially fully closed position until air flow against the first and second door assemblies reaches the respective first and second threshold velocities whereby the first and second door assemblies move to the substantially fully open positions thereof.

22. The fan shroud assembly of claim 21 wherein the door of the first door assembly and the door of the second door assembly are configured such that the first threshold air velocity is greater than the second threshold air velocity.

23. A fan shroud assembly for providing a flow of cooling air in an automotive application, which comprises:

a housing defining a generally centrally disposed fan opening dimensioned to accommodate an electric fan and at least one peripherally disposed side door opening; and a door member pivotally mounted at an intermediate portion of the door member to the housing adjacent the at least one door opening, the door member adapted for pivotal movement from a substantially fully closed position to a substantially fully open position in response to air flow thereagainst to thereby permit at least part of the air flow to pass through the at least one door opening.

24. The fan shroud assembly of claim 23 including an electric fan mounted within the fan opening of the housing.

25. The fan shroud assembly of claim 23 wherein the door member is dimensioned and configured to remain in the substantially fully closed position until air flow thereagainst achieves a minimum threshold velocity whereupon at the minimum threshold velocity the door member moves from the substantially fully closed position to the substantially fully open position.

26. The fan shroud assembly of claim 25 including a plurality of peripherally disposed door openings and a plurality of door members, each door member being pivotally mounted to the housing adjacent a respective door opening.

27. The fan shroud assembly of claim 26 wherein a first door member is dimensioned to move from the substantially fully closed position thereof to the substantially fully open position thereof in response to air flow thereagainst at a first threshold velocity and wherein a second door member is dimensioned to move from the substantially fully closed position thereof to the substantially fully open position thereof in response to air flow thereagainst at a second threshold velocity, the second threshold velocity being greater than the first threshold velocity.

28. The fan shroud assembly of claim 25 wherein the door member is dimensioned to move from the substantially fully closed position thereof to the substantially fully open position thereof in response to air flow thereagainst at a first air flow velocity corresponding to the minimum threshold velocity, and further wherein the door member is dimensioned to move from the substantially fully open position thereof to the substantially fully closed position thereof in response to air flow thereagainst at a second air flow velocity, the second air flow velocity being less than the first air flow velocity.

29. The fan shroud assembly of claim 23 wherein the door member is dimensioned and configured to move to the substantially fully open position in response to air flow thereagainst at a first air flow velocity and to move from the subtantially fully open position to the substantially fully closed position in response to air flow thereagainst at a second air flow velocity, the second air flow velocity being less than the first air flow velocity.

30. The fan shroud assembly of claim 23 wherein the housing defines a horizontal axis and a vertical axis and wherein the door is pivotally mounted about a pivotal axis which is in general parallel relation to the horizontal axis.

* * * * *